Oct. 20, 1925.  
R. D. PIKE  
1,557,873  
CONTINUOUS METHOD AND APPARATUS FOR CALCINING AND CLINKERING  
Filed Dec. 1, 1920  
5 Sheets-Sheet 1

WITNESS

INVENTOR  
R. D. Pike  
BY  
ATTORNEYS

Oct. 20, 1925.

R. D. PIKE 1,557,873

CONTINUOUS METHOD AND APPARATUS FOR CALCINING AND CLINKERING

Filed Dec. 1, 1920     5 Sheets-Sheet 4

WITNESS

INVENTOR
R. D. Pike
BY
Ackers Totten
ATTORNEYS

Patented Oct. 20, 1925.

1,557,873

UNITED STATES PATENT OFFICE.

ROBERT D. PIKE, OF SAN FRANCISCO, CALIFORNIA.

CONTINUOUS METHOD AND APPARATUS FOR CALCINING AND CLINKERING.

Application filed December 1, 1920. Serial No. 427,466.

*To all whom it may concern:*

Be it known that I, ROBERT D. PIKE, a citizen of the United States, residing at San Francisco, in the county of San Francisco and State of California, have invented certain new and useful Improvements in Continuous Methods and Apparatus for Calcining and Clinkering, of which the following is a specification.

The hereinafter described invention relates to an improved method and apparatus for the conducting and carrying out of a continuous process for the calcination of substances composed largely of carbonate rocks, such as calcite and magnesite, and the forming of the calcined product by chemical combination at high temperature into a clinkered or semi-fused mass.

It will be understood that the calcination and clinkering of the products composing Portland cement and dead burned magnesite fall within the scope of the present invention, the object of the invention being to accomplish the calcination and clinkering of the material with greater economy in the use of fuel, to increase the output of the clinkered mass from a single unit of given capacity, and to improve the quality of the product.

At present there is utilized in the art for the calcining and clinkering of such material two well known types of machines, one being known as the stack kiln and the other as the rotary kiln. It has been long known that dead burned magnesite and cement clinker can be produced in stack kilns with materially less fuel than used in rotary kilns. In the former, the raw material is introduced at the top thereof, becoming calcined and converted into clinker, passing down, and finally being drawn from the bottom in a substantially cold condition. However, the rotary kiln has supplanted the stack kiln by reason of certain advantages which serve as an offset to the high fuel cost involved in its use. For example, the feed of the material into the rotary kiln is in a pulverulent form, while the feed of the material into the stack kiln must be in lumps or briquets of proper size to permit the passage of the draft upward through the kiln, and at the same time must be strong enough to hold up the burden of the charge. This requirement of the stack kiln introduces a great difficulty when two or more raw materials have to be intimately mixed to produce a clinker of the desired composition, because the separate materials are required first to be formed into lumps or briquets after being ground and mixed, and these lumps or briquets in most cases are not strong enough to support the burden of the charge without crumbling while passing through the stack kiln. The rotary kiln overcomes this difficulty in a perfectly obvious manner by taking the materials in a pulverized form and keeping the particles in a state of agitation and in intimate contact, one with the other, throughout the process of calcination and clinkering. The rotary kiln produces a clinker of substantially uniform quality, while the clinker from the stack kiln always has to be selected to remove the under-burned material, and the rotary kiln has a much larger capacity than the stack kiln and employs less labor per ton of material produced.

In the rotary kiln the material enters at the upper or more elevated end, due to the rotation of the kiln, passes downwardly. All of the fuel is injected at and is burned at or near the lower end, and the formation of clinker is effected in the hottest part of the flame. The gases of combustion passing upwardly from the clinkering zone, effect calcination of the downwardly moving material before it enters the clinkering zone. The formation of clinker from the calcined material is an operation requiring but little heat and in some cases actually liberating heat, but the temperature required is high; while the calcination is an operation absorbing much heat at a temperature considerably below that required for clinkering. It results, from the operation in the rotary kiln in which the dissimilar reactions of calcining and clinkering are carried on under similar conditions, and in rapid succession, that the calcination is not performed efficiently. An excess amount of fuel is invariably injected to cause clinkering, over that required to effect calcination, provided the latter operation were performed efficiently. The result is that there is always a great waste of heat energy up the stack from rotary kilns, which can only be partially recovered in present practice by the use of waste heat boilers.

In the stack kiln, the same conditions prevail in a general way, but the operation is slower and a greater surface of the material being calcined is exposed to the hot gases leaving the clinkering zone. This results in the hot gases giving up more of their heat in performing the operation of calcination, and in their passing up the stack at a lower temperature than is possible in the rotary kiln.

With the present invention the fuel economy of the stack kiln is bettered, and at the same time greater capacities are attained than are now possible with the rotary kiln, as well as better quality of clinker, while the disadvantage or loss of either form of apparatus is eliminated, thereby permitting the carrying out of a continuous process of calcination and clinkering at a materially less cost than that at which the same has heretofore been accomplished.

In general, the method consists in first subjecting the raw pulverulent material to the action of a flowing stream of air and gases of combustion to effect the heating thereof, and subsequently treating the material while passing downwardly in counter-current to the said stream of travelling hot air and gases of combustion to produce calcination; thence without allowing the calcined material to come into contact with the outside atmosphere, transferring the same from the calcining means to clinkering means, and causing the calcined material to move through the clinkering means while in contact with a counter flowing stream of air and gases of combustion heated to a temperature sufficient to produce clinkering of the calcined material, and conveying the waste products of heat from the clinkering means to the calcining means, to serve as a portion of the heat units for calcination; thence without allowing the clinkered material to come into contact with the outside atmosphere, transferring the same from the clinkering means to a cooling means and subjecting the material therein to a counter flowing stream of air which absorbs the heat therefrom and conveys it to the clinkering means, thence afterwards to the calcining means where it assists in the respective operations. In other words the treatment of the material is divided into distinct and separate steps, the first being that of calcination, the second that of clinkering, and the third that of cooling, each step being carried out in an apparatus designed for its most efficient performance.

An efficient apparatus for carrying out the method invention comprises the use of a furnace for calcining, of the circular multiple-hearth type, with rotating radial rabble arms, an associated rotary furnace for clinkering, and a rotary cooler for receiving the clinkered material from the rotary kiln. In carrying out the method by said apparatus, the raw feed passes downwardly in a continuous stream through the separate apparatus, first through the calcining furnace, thence through the clinkering furnace and thence through the cooler. The air and gases of combustion and calcination pass in continuous counter-current to the material, entering the lower end of the cooler and leaving the top of the calcining furnace in a relatively cool condition. In the clinkering furnace the stream of highly heated air from the cooler is continuously augmented by the addition of just sufficient fuel to effect clinkering, and in the calcining furnace the stream of highly heated air and gases of combustion and calcination is continuously augmented by the addition of just sufficient fuel to effect calcination, and in the upper part of the calcining furnace the heat of the gases is given up in heating the materials to the calcining temperature.

There is thus established a continuous counter-current of material in a downwardly direction and of gases and air in an upwardly direction, passing successively through separate apparatus, each piece of apparatus being highly efficient for the purpose for which it is intended, and each utilizing the waste heat from all of the apparatus beneath it.

In carrying out the method by the said apparatus, all of the hot gases from the rotary kiln pass directly to the calcining furnace, entering the latter over the lower hearth or lower several hearths. Here they assist directly in calcination due to the heat they contain, and indirectly by furnishing the oxygen to burn the fuel fired in the calcining furnace, for these gases from the rotary furnace are rich in oxygen and contain a sufficient quantity of it to burn all of the fuel required for calcination.

The additional fuel required for calcination may be introduced into the calcining furnace by any one of several means. Coke braize or any kind of finely divided coke may be mixed with the materials before treatment. This coke is ignited by the hot gases from the rotary furnace either alone or assisted by auxiliary burners which may inject fuel either into the flue connecting the rotary kiln with the calcining furnace or directly into the latter, and in burning furnishes the heat necessary for calcination. Coal in a more or less finely subdivided condition—for example, ground to pass 8-mesh—may be fed on to one or more of the hearths of the calcining furnace by any suitable means, either down through the central rotating shaft of the furnace or through openings in the furnace shell. Suitable burners may inject oil, pulverized coal or gas into the calcining furnace or into the path of the hot gases from the rotary kiln. Any desired combination of the mentioned means of firing the calcining furnace may be used.

The rotary clinkering furnace is fired by a burner at the lower end, which injects fuel in an axial direction into the highly heated air which is flowing upwardly through the rotary kiln from the cooler. The fuel may be pulverized coal, oil, gas or any suitable fuel for the purpose. Only sufficient fuel is fired to effect clinkering. The quantity will vary with different materials, but will usually be from 15% to 30% of the total fuel required to effect both calcining and clinkering.

To comprehend the method invention and a form of apparatus for carrying out the same, reference should be had to the accompanying sheets of drawings, wherein Figure 1 is a side elevation of the apparatus, said view illustrating the vertical multiple-hearth element wherein the calcination of the material is accomplished as fed therethrough, a longitudinally disposed rotary clinkering member connected to the vertical member by means of a closed conduit, also disclosing the bypass connection between the vertical element and the rotary element whereby the waste products of heat escaping from the rotary element are conveyed to the vertical element, also disclosing the rotary cooler associated with the rotary clinkering member of the apparatus, through which the clinkered material is passed for cooling, and the bypass connection between the rotary cooling element and the rotary clinkering element whereby the heated air from the former is transferred to the latter.

Figure 8 is a broken vertical sectional view of means for feeding coal on to hearths in the vertical calcining furnace.

In the drawings, the numeral 1 is used to designate the vertical element of the apparatus employed for calcination, 2 designates the rotary element of the apparatus utilized for the clinkering of the material transferred thereto from the vertical element 1, and 3 designates a rotary cooler situated in a plane below that of the rotary element 2, which is designed to receive the hot clinkered material from the said element. The rotary element 2 utilized in the present apparatus is of a length of approximately 50 feet more or less and of a diameter of approximately 8 feet, and is provided with a tapered upper end 5. The said rotary kiln 2 is lined throughout interiorly with refractory brick lining 6 and is provided at its lower end with a firing hood 7 through which is introduced a burner 8. The said hood 7 does not rotate with the element 2, but surrounds the lower end of said element and is mounted on wheels 9 so as to permit of the same being moved toward or from the kiln 2 in an axial direction, to provide access to the interior of the said kiln when not in operation. The running joint between the firing hood and the kiln 2 is made as tight as possible to reduce the leakage of air to a minimum and the said firing hood 7 is provided with a protected sighthole 10 and is further provided with a discharge opening 11 in the bottom thereof, which permits of the hot clinkers discharging from the rotary kiln 2 to drop or pass through a closed discharge spout 12, water cooled where exposed to the hot air, into the upper end of the rotary downwardly inclined cooler 3. The upper reduced or tapered end of said cooler 3 enters into a chamber 13 through a rotating seal 14, which seal is adapted to prevent the leakage of outside air into the system. The chamber 13 is preferably formed of sheet metal, lined on the inside with fire brick backed by insulating brick. The seal 14 between the tapered end of the rotary cooler 3 and the chamber 13 is similar in all respects with the seal 15 introduced between the tapered upper end of the rotary kiln 2 and a dust chamber 16 introduced between the rotary kiln 2 and the vertical kiln 1. The exposed surface of the rotary cooler inside the dust chamber is protected from the hot air by the fire clay tiles 13' and the annular ring $13^2$ for cooling.

The rotary cooler 3 in construction is similar to that of the rotary member 2, being approximately 6 feet in diameter by approximately 90 feet in length, and its function is to receive heat from the hot clinkers discharged through the spout 12 and transfer this heat into the air for combustion, which heated air passes on upwardly into the rotary kiln 2 through the bypass connection 17, thereby reducing loss from radiation to a minimum and insuring all the heat from the hot clinkers intermixing with the air passing through the cooler from its lower end, which is open to the atmosphere.

The interior upper 45 feet more or less of the rotary cooler is lined with refractory brick of dense, hard composition backed up by insulating brick. As the clinker passes from this portion of the cooler into the upper end of the lower 45 feet more or less, it is barely red hot. In the lower 45 feet more or less the clinker is in contact with the inside of the rotating steel shell which is provided with lifting vanes 24' which drop the clinker through the upwardly passing air. This lower length of the cooler is lined on the outside with insulating material, the said cooler permitting the transferring of practically all of the heat from the clinker to the air for combustion which, when it leaves the upper end of the cooler, is very hot, necessitating protecting all metal surfaces exposed to it.

The exposed surface of the rotary kiln 2 inside the dust chamber 16 is protected from heat by fireclay tiles 18 and an annular ring 19 for cooling. The dust chamber 16 is provided with clean-out doors 20 for the removing of accumulated dust, and the inner walls of said chamber are lined with refractory brick backed up by insulating material. The said dust chamber is connected with the lower portion of the vertical calcining furnace 1 by means of the bifurcated flue 21, said flue preferably being made of sheet metal lined with suitable refractory and insulating material, and the same is connected by tight joints 22 with the said dust chamber 16 and the lower portion of the calcining furnace 1. Clean-out doors are provided to make easy the removal of dust from the inside surface. The said calcining furnace 1 is connected with the rotary kiln 2 by means of a water-cooled discharge spout 23, through which spout the calcined material discharging from the furnace 1 flows downwardly and is introduced into the upper tapered end of the rotary kiln 2.

The construction of the calcining furnace 1 is disclosed as to details in Figures 2, 5, 6 and 7 of the drawings. The prepared material in pulverulent form to be calcined is delivered into the furnace 1 in any suitable manner, preferably through the medium of the feed box 24, which is adapted to continuously feed the raw material into the upper end portion of the said furnace, the gases from the said furnace escaping therefrom through the conduit 25. The vertical furnace within which the material is calcined is preferably composed of an outer steel shell 26, suitably supported or upheld by the supports 27 and the shell 26 is provided with the inside refractory lining wall 28 separated from the metallic shell 26 by means of the insulating lining 29. Within the cylindrical furnace 1 is arranged a series of hearths 30 and 31 which hearths are arranged in superposed relation. The said hearths are of circular form and are projected inwardly from the lining 28, the series of hearths 30 being provided with a central aperture to provide a clearance 32 for the free passage of material between the inner peripheral wall thereof and the central air cooled revolving column 33, while the hearths 31 are provided, adjacent the lining 28, each with a series of cutouts or openings 34, through which material under treatment escapes on to the hearths 30. That portion of the central air cooled revolving column 33 which is within the zone of calcination of the material under treatment (which zone extends from the bottom furnace 1 up to the point marked A) is provided with a refractory lining 35 to protect the same against the action of the high temperature of the heated body of air and gases of combustion and calcination, flowing upwardly through the furnace, the cooler portion of the furnace or that portion from A upwardly having the said central air cooled hollow shaft unprotected by refractory lining.

The central hollow shaft 33 is driven or has rotation imparted thereto by any suitable form of drive mechanism, as for instance by the gear 39 which meshes with a drive gear 40 driven from any suitable source of outside power. This hollow central shaft is composed essentially of two parts—an inner cylinder 33' and an outer cylinder $33^2$, the latter enclosing within itself the former and an annular space 34'. Air for cooling is introduced into the lower extremity of the inner cylinder (a suitable running joint being provided to prevent leakage of air to the outside atmosphere) and passes radially outward through a number of passages 39' which conducts it through the annular space 34' and delivers it outside of the central shaft. To the said shaft are rigidly attached a series of air cooled unprotected rabble arms 41 and protected arms 42. Each of these rabble arms comprises within itself two longitudinal passages 42' and $42^a$ connected at their outer extremity with each other. One of these passages of each arm registers at its inner end with one of the passages 39' connecting with the interior cylinder of the central rotating shaft, and the other registers with a passage $39^2$ connecting with the annular space 34'. The latter is connected at its upper end with a stationary air passage $40^a$ through a running joint $40^b$. The result of this arrangement is that cold air under pressure enters the lower extremity of the central cylinder of the hollow rotating shaft, and passes outwardly through one longitudinal passage of each rabble arm, and returning through the other longitudinal passage passes into the annular space and is thence discharged from the upper part of the furnace.

Each of the protected rabble arms 42 is provided on its sides with the longitudinally disposed feathers 40' and on its bottom with the longitudinally disposed V-shaped recess $40^2$. The fire clay U-shaped tiles $40^3$ are adapted to slide over the said rabble arm engaging with the feathers 40' and butting at the inner end of the rabble arm against the fire clay tiles 44'.

When fitted over the rabble arm 42, the said U-shaped tiles $40^3$ are held in locked position by means of the end lock tile $44^2$, which is attached to the projecting end $44^3$ of the rabble arm 42 by means of the securing bolts $44^5$.

The rabble arms 41 in the portion of the furnace above A are made in the usual fashion of cast iron, and do not have to be protected, but the rabble arms 42 in the part of the furnace below A have to be protected from the excessive heat of calcination to prevent injury and also to prevent the excessive loss of heat to the circulating air. It is to be understood that in this apparatus such heat as passes to the circulating air is practically all wasted, for this air cannot be utilized for combustion, it being necessary for highest efficiency to bring all of the air for combustion in the calcining furnace up through the cooler and clinkering furnace.

The rabble arms 41 and 42 are provided respectively with the rabble teeth $a$ and $b$. On the rabble arms which are above the hearths 31 the angle of the rabble teeth is so disposed as to move the material outwardly, while on the alternate rabble arms the angle of the rabble teeth is so disposed as to move the material inwardly. Rabble teeth $a$ are of the usual design and are made of cast iron, but rabble teeth $b$ are made of nickel chrome alloy or some other alloy or metal resistant to high temperature, and are so made as to permit of a refractory lining $44^6$ being interposed between their upper side and the bottom of the protected rabble arms.

The rabble teeth $b$ of the protected rabble arms 42 are formed integral with a top plate $41^a$, which plate is provided or formed with the side flanges $41^b$ and the upwardly extended wedge shaped central longitudinally disposed projection $41^c$. This wedge shaped projection is adapted to slide within the V-shaped recess $40^2$, and serves to secure the position of the teeth in proper relation to the material being treated.

To prevent material and gases passing between those of the hearths over which the material moves outwardly, and the central rotating column or shaft, the seals $44^a$ and $44^b$ are provided, the former being made of cast iron and the latter of nickel chrome alloy or any alloy or metal resistant to the action of high temperature.

Figure 1:
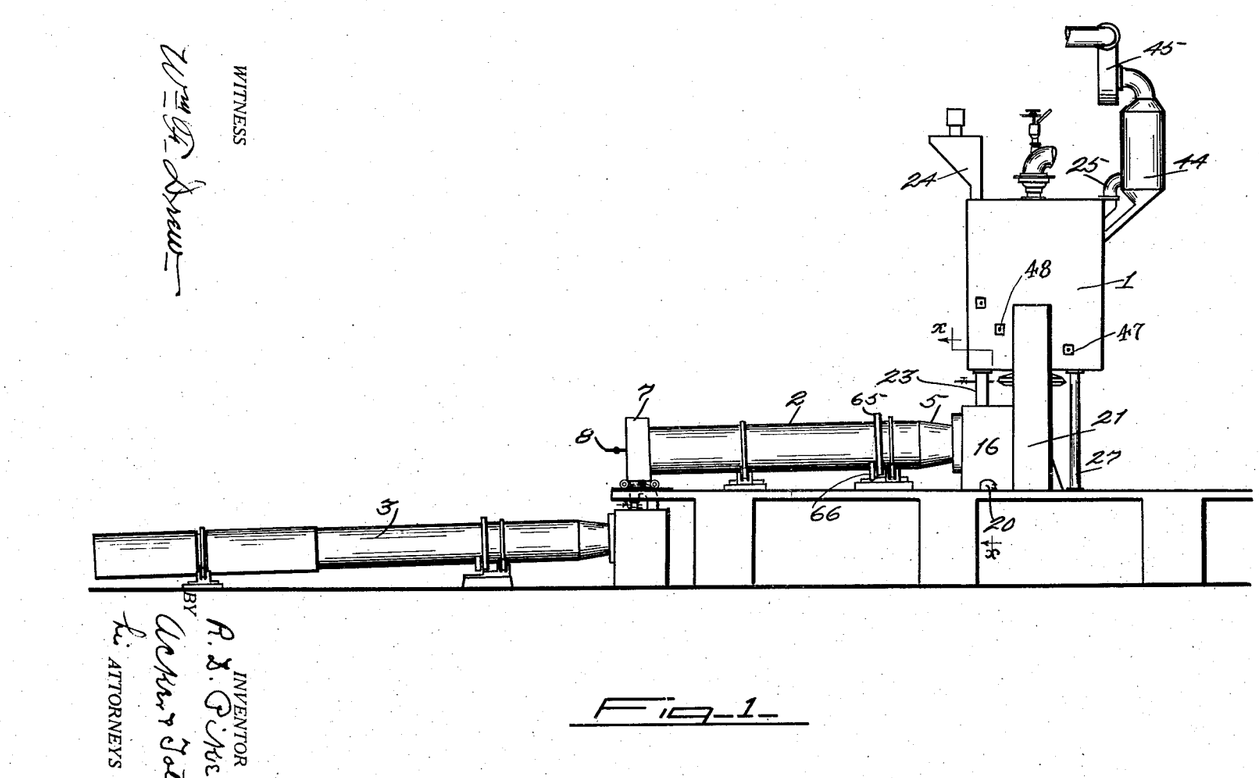
Figure 2:
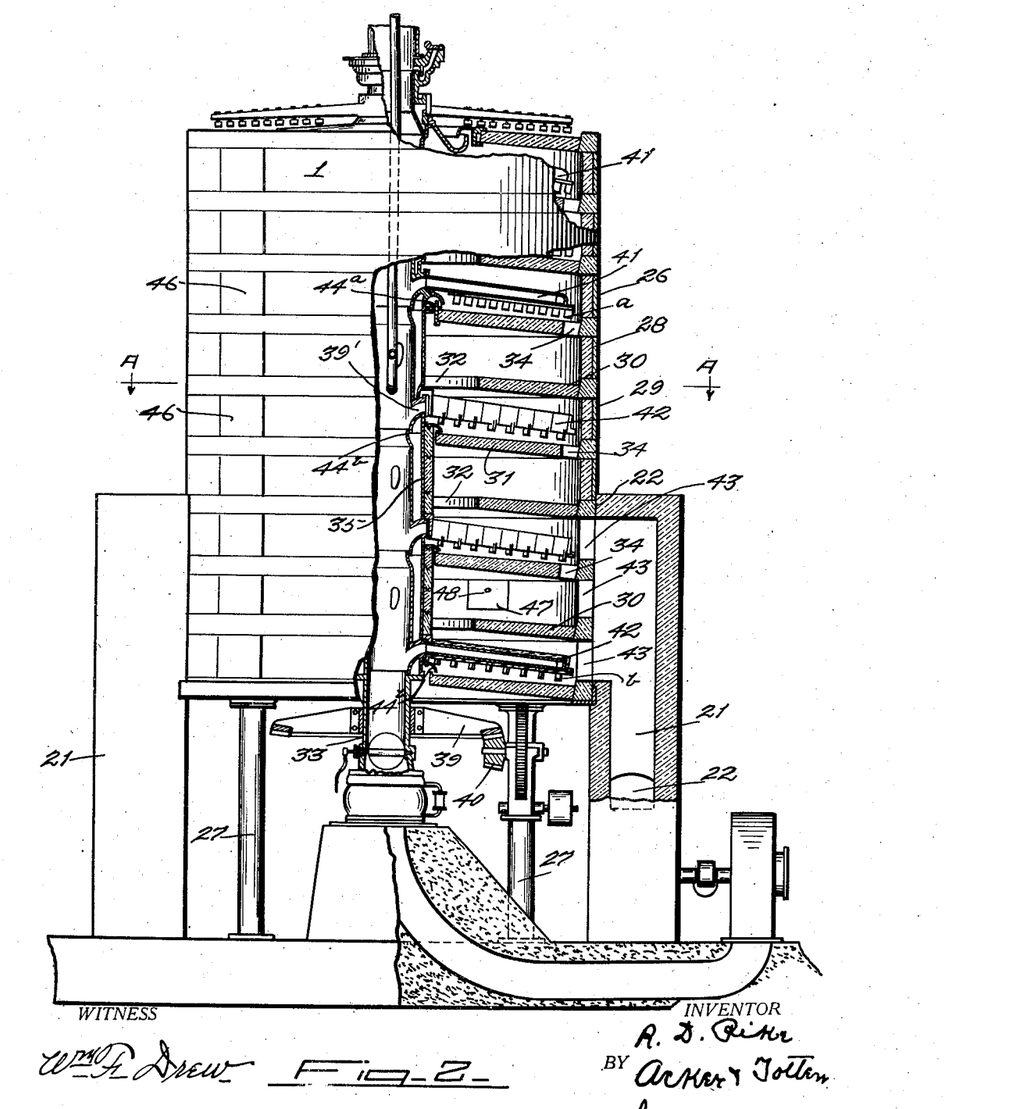
Figure 2 is a vertical sectional view of the vertical multiple-hearth calcining element of the apparatus.
Figure 3:
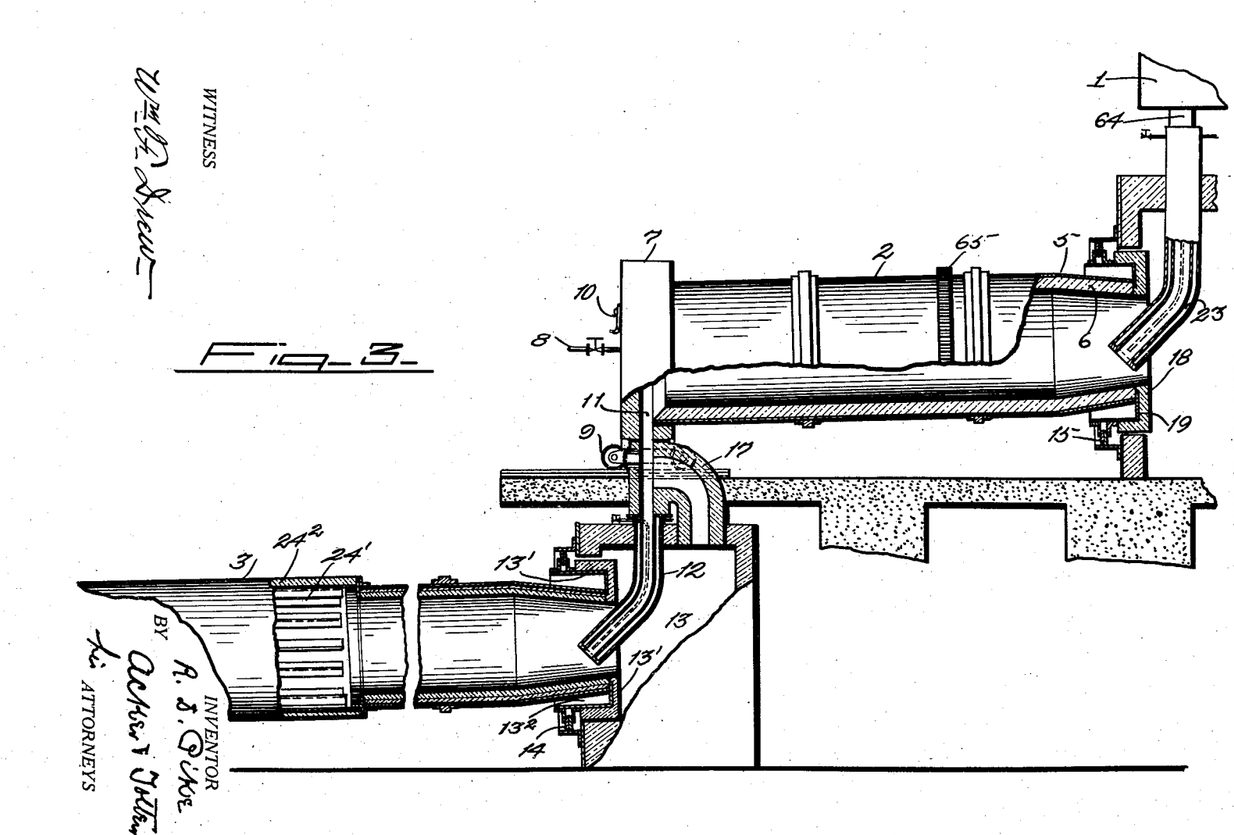
Figure 3 is a longitudinal sectional view taken through the rotary cooler, rotary clinkering elements of the apparatus, and through the connection between the vertical calcining element and the rotary clinkering element of the apparatus.
Figures 3, 4:
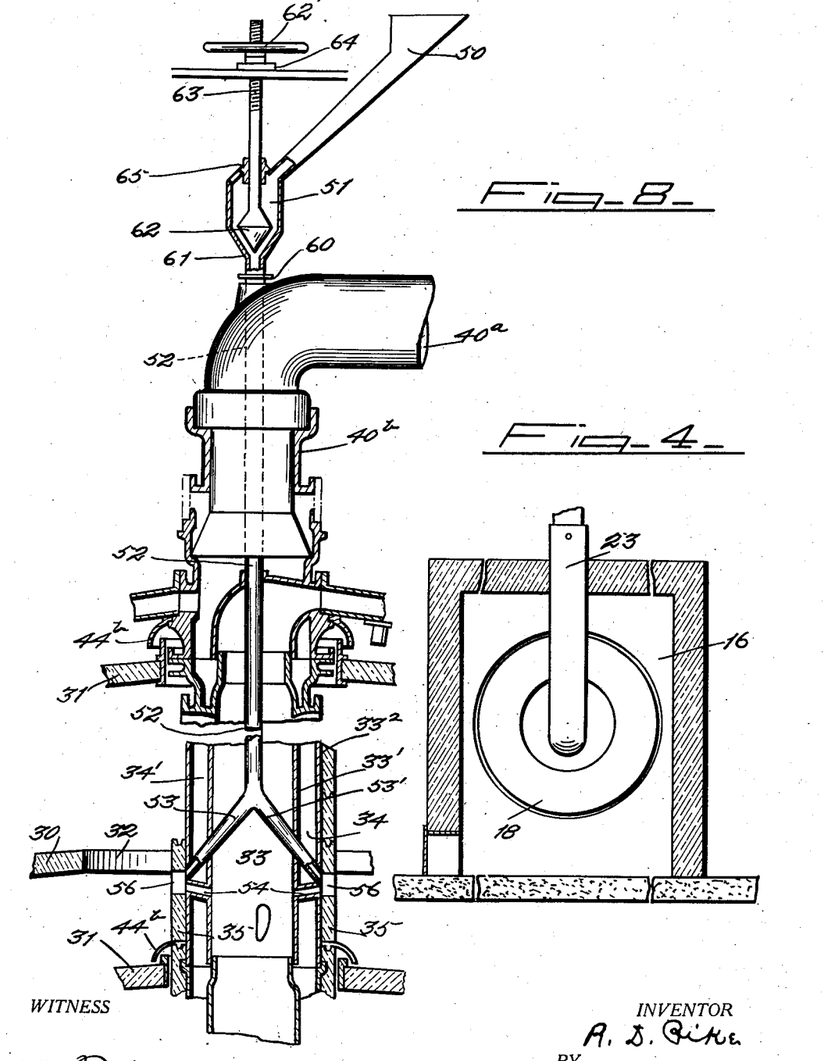
Figure 4 is a vertical sectional view taken on line X—X of Figure 1 and viewed in the direction of the arrows.
Figures 5, 6, 7:
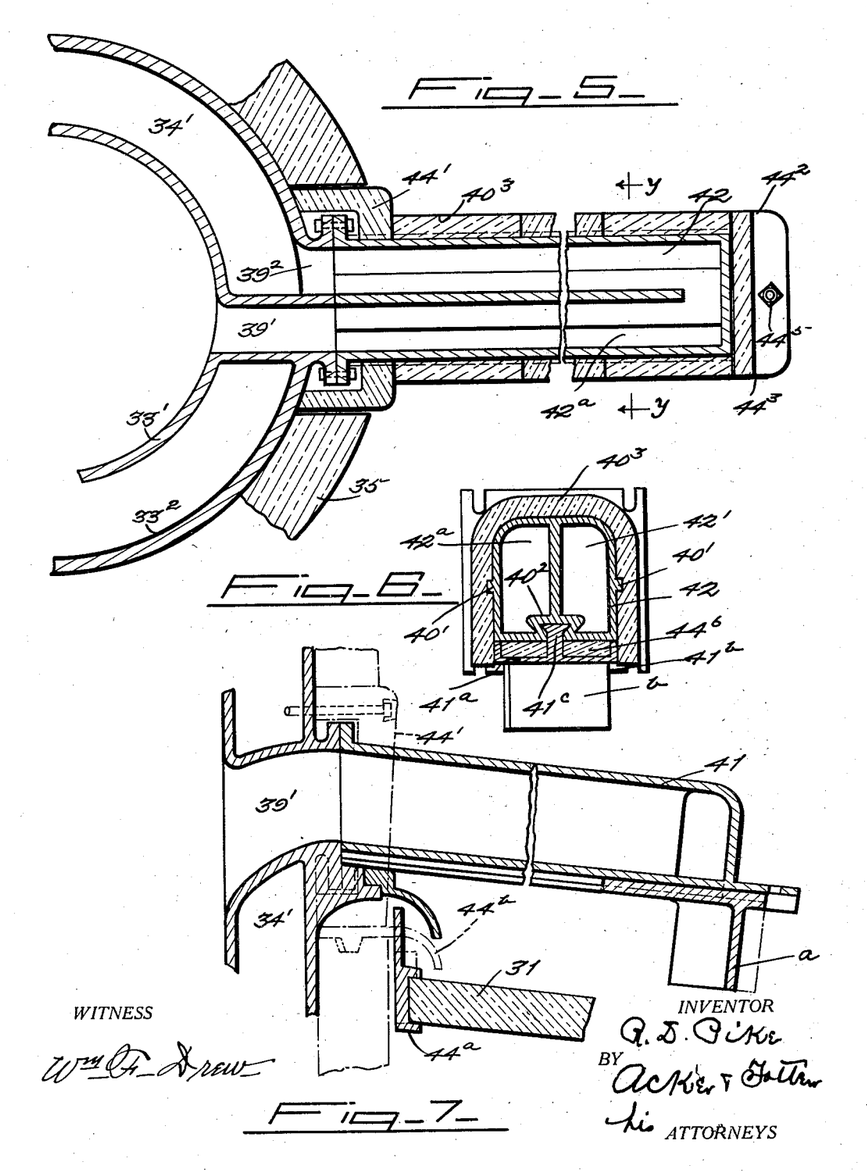
Figure 5 is a longitudinal sectional view through a protected rabble arm and the central rotating column of the vertical calcining furnace.
Figure 6 is a cross sectional view taken on line Y—Y Figure 5 of the drawings.
Figure 7 is a longitudinal sectional view through one of the unprotected rabble arms.

Figures 5 and 6 show detail of construction of a protected rabble arm, and the protected central rotating shaft.

The bifurcated flue 21 from the dust chamber 16 introduces the hot air and gases from the rotary clinkering furnace through the several ports 43 over the lower three hearths of the calcining furnace. The gases leaving the upper hearth of the calcining furnace preferably pass through a suitable precipitator 44, which removes the dust, returning it to the calcining furnace. The draft for the entire apparatus may be furnished by the suction fan 45 or by a stack not shown.

Openings 46 provided with covers are placed at each hearth to give easy access for cleaning and repairs. Airtight openings 47 are provided for burners 48 over each of the lower three hearths. These burners may use either pulverized coal, gas or oil for fuel and may or may not be used continuously, but in any event are provided as auxiliary means for heating the calcining furnace.

Figure 8 discloses means for firing the calcining furnace, where coal is employed as the combustible medium. Coal ground so that all will pass 8-mesh screen is the preferable fuel used. This is fed on to the fifth hearth from the bottom, on which hearth the material is moving outwardly.

The coal is fed by an automatic feeder, adapted to maintain any desired feed, into the hopper 50, and passes downwardly into the vertically disposed cylinder 51. The latter terminates the upper end of a feed pipe 52, the center of which coincides with the axis of the rotating central shaft. The lower end of the pipe 52 terminates in the two branches 53 and 53', sloping downwardly at a sharp angle and passing through both the wall of the inner and outer cylinder of the central rotating shaft. The lower ends of the branches are flattened to have a rectangular opening with long axis in a horizontal plane. Immediately below the lower ends of the branches are rectangular openings 54, connecting with the interior of the inner cylinder of the central rotating shaft. The refractory protection 35 of the latter, immediately in front of the extremities of the branches 53 and 53', and the passages 54, is removed, leaving a more or less square opening 56, which gives a free passage from the passages 54 and the ends of the branches 53 and 53' into the calcining furnace. The outer cylinder of the central rotating shaft connects through the running joint $40^b$ with the bent pipe $40^a$, which conducts the heated circulating air away from the furnace. The pipe 52, which it will be seen, rotates with the central shaft, extends through the pipe 40ª and through the stuffing box 60. The cylinder 51 is connected to the pipe 52 by a conical part 61. The conical plunger 62 is adapted to find a seat on the inside surface of the conical part 61. This plunger does not rotate, but its position up and down may be altered by turning the hand wheel 62' which engages the screw 63 and the stationary support 64. The smooth shank of the screw 63 is further supported by the spider and bearing 65.

In operation, the automatic feeder is set to deliver uniformly the desired amount of coal, and the height of the conical plunger 62 is so regulated that the cylinder 61 remains full of coal, thus preventing cold air being drawn into the furnace down the feed pipe 52. The falling coal is equally divided between the branches 53 and 53' of the feed pipe, and as it emerges from their lower ends is blown by the air issuing under pressure through the opening 56 in a fan-shape curtain out over the material on the furnace hearth, thus giving a uniform feed of coal with a small quantity of air. Having once been uniformly deposited on the hearth, the coal is uniformly moved forward by the rabble teeth. The air issuing through the openings 56 also serves to keep the coal in the nozzle below the carbonizing point.

When the coal is deposited over the material on the hearth, its volatile constituents immediately ignite and burn, until the combustible gases are entirely consumed. The nonvolatile or coky constituents of the coal pass downwardly with the material to be calcined, and their combustible matter is entirely consumed before the materal leaves the calcining furnace. The coal can be just as easily spread over additional hearths, although one will usually suffice.

If it is desired to use coke braize or finely divided coke as a fuel in the calcining furnace, no special apparatus is needed, it being simply necessary to mix the coke with the raw feed in proper proportion before introduction into the top of the calcining furnace.

The lowermost hearth of the series of said hearths, and which hearth constitutes so to speak the bottom of the vertical furnace, is provided with a discharge port 64, through which the calcined material discharges into the water cooled closed chute or spout 23 for delivering the same into the rotary kiln or furnace 2.

In the operation of the above described means for carrying out the method invention, the material to be treated in pulverized form is fed in a continuous stream by any suitable form of automatic feeder, on to the uppermost hearth (usually the ninth hearth from the bottom) of the calcining furnace. Thence it passes downwardly in zig-zag course over the successive hearths. In the upper portion of the furnace heat is imparted to it by the gases of combustion and calcination passing in counter-current to it, until when it enters the fifth hearth from the bottom it has become hot enough to support combustion of the coal added on this hearth. The combustion of this coal, combined with the heat received from the rotary kiln effects calcination in the lower five hearths. In the manufacture of Portland cement, care must be exercised not to overheat the material in the calcining furnace, lest incipient clinkering start, which would be undesirable. In the making of Portland cement, the temperature of the calcining furnace should not exceed approximately 2000° F., and this temperature may be attained more or less uniformly on the five lower hearths. In the making of magnesite, a lower temperature, about 1600° F. is maintained on the lower five hearths. The hot calcined material is discharged from the lowest hearth through the water cooled spout, directly into the rotary kiln, thence passing downwardly the temperature of the material is rapidly raised by the combustion of the fuel, and the clinker begins to form in the upper portion of the kiln. This clinker being subjected to the action of heat for its formation for the comparatively long time required to pass to the lower end of the rotary kiln, has all the necessary chemical actions within itself thoroughly and uniformly completed, and will therefore be of better and more uniform grade than the rapidly formed clinker of the rotary kiln or the imperfectly formed clinker of the stack kiln. The temperature of clinkering in the rotary kiln will range from 2700° to 3000° F. with both Portland cement and magnesite. The rotary kiln and the rotary cooler are revolved by any suitable form of drive means, as for instance by the gear ring 65 thereon meshing with the driven gear 66.

When the clinker leaves the lower end of the rotary kiln it still retains almost the maximum temperature, and all that is necessary is that the heat be extracted in the rotary cooler. The clinker is discharged from the cooler in a relatively cool condition.

Considering the operation of the firing of the apparatus, cold atmospheric air is induced to enter the lower open end of the rotary cooler by the draft within the apparatus, and leaving the upper end enters the rotary kiln in a highly heated state. The draft in the apparatus is regulated either by the speed of the exhausting fan or by a damper in the stack, if the latter is used. The operator regulates the quantity of fuel fed into the rotary kiln, so that just enough is used to complete the operation, of which he can judge by the appearance of the clinker which he can observe through suitably arranged sight-holes which are covered with Pyrex glass to prevent the infiltration of cold air. The amount of coal to be fed into the calcining furnace is arbitrarily chosen and is kept in constant ratio to the feed by suitably arranged automatic feeders of any well known design. From 70 to 85% of the total fuel required is fed to the calcining furnace. This quantity will vary with the material being treated, and with the judgment of the operator.

The net result of the operation of this method and apparatus is that both the clinker and the stack gases are discharged at relatively cool temperatures, which is an indication of its high fuel economy, and the clinker is of exceptionally uniform and high quality.

A further understanding of the reason for the great capacity and high fuel economy inherent in this method and apparatus may be had by considering the area of material exposed in the inside of the apparatus to the hot gases, as related to the outside area of the apparatus exposed to the atmosphere, and comparing this relation to the same relation in the case of a rotary kiln. Take for example, with the new method and apparatus, a rotary kiln 8' in diameter by 50' long in combination with a 9-hearth calcining furnace 21' 6" outside diameter: The surface of the charge exposed to the action of the gases inside the apparatus is approximately 3,000 sq. ft. and the outside area of the apparatus exposed to the atmosphere is approximately 4,600 sq. ft., giving a ratio of outside surface to inside surface of 1.54. A rotary kiln 10' in diameter would have to be about 600' long to have the same area of charge exposed inside the apparatus (it is mechanically impractical to make a rotary kiln 600' long, 200' appearing to be the highest practical limit) and the outside area exposed to the atmosphere would be 18,850 sq. ft. giving a ratio of outside to inside area of 6.28.

It therefore follows from this comparison that economical units in accordance with this invention can be made in larger size than when using a rotary kiln, and the ratio of radiation losses to useful work performed will necessarily be much smaller than with the rotary kiln. The losses by radiation may further be made smaller in the new apparatus than in the rotary kiln, because the stationary shell of the calcining furnace can be more thoroughly insulated than can the rotating shell of the rotary kiln.

By the use of my invention I am able to effect a saving in the manufacture of Portland cement of from 15 to 25 cents per barrel, and in dead burned magnesite of approximately $2.00 per ton, as compared with any known method of manufacture. The saving effected will depend of course in great measure upon the price of fuel. In addition, I am enabled to build practical commercial units of greater capacity than is possible by present known means, thus effecting a saving in charges for handling material.

Having thus described my invention what I claim as new and desire to secure by Letters Patent of the United States is as follows:—

1. The continuous method of calcining and clinkering carbonate rock, by the action of a flowing stream of heating mediums having different temperatures, which consists in first reducing the material into a pulverulent form, then while contained within a closed stationary structure passing the same counter-current to a stream of heated air and gases to effect the heating thereof, then intermixing fuel therewith, thence while contained within the said stationary structure passing the same through a counter-flowing stream of heated air and gases having sufficient temperature to cause ignition of the fuel and sufficient oxygen to support combustion thereof, to produce calcination, then without permitting an exposure of the calcined material to the outside atmosphere, transferring the same from the said structure to a closed rotary structure, and passing the same therethrough in direct contact with a counter-flowing stream of heated air and gases having a temperature sufficiently higher than that required for calcination, to cause clinkering of the said material, and passing the waste products of heat from the said rotary structure into the first mentioned structure for the utilization thereof as a portion of the heat for calcination.

2. An apparatus for the described purpose, the same comprising a vertically disposed stationary calcining furnace, means therein for propelling pulverulent material to be treated therethrough, means for intermixing with the pulverulent material a fuel medium, means for introducing within the furnace a heat medium having a temperature sufficient to cause calcination of the material passing therethrough and flowing counter-current to the stream of material passing through the said furnace for calcination, a rotary clinkering furnace associated with the calcining furnace, means for transferring the calcined material discharging from the calcining furnace directly into the rotary clinkering furnace without exposure to the outside atmosphere, means for introducing into the clinkering furnace a heat medium of a temperature to cause clinkering of the calcined material as passed therethrough and counterwise to the flowing stream of the heat medium, means for conveying the products of combustion from the clinkering furnace into the calcining furnace, a cooler associated with the clinkering furnace and adapted to receive the clinkered material discharging therefrom, and means for delivering air passing through the cooler into the clinkering furnace for supporting combustion therein.

3. The continuous method of calcining and clinkering carbonate rock by the action of a flowing stream of heating mediums having different temperatures, which consists in first reducing the material into a pulverulent form, then while contained within a closed stationary structure passing the same counter-current to a stream of heated air and gases to effect the heating thereof, then intermixing fuel therewith, then while contained within the said stationary structure passing the same through a counter-flowing stream of heated air and gases having sufficient temperature to cause ignition of the fuel and sufficient oxygen to support combustion thereof, to produce calcination, then transferring the same from the said structure to a closed rotary structure, and passing the same therethrough in direct contact with a counter flowing stream of heated air and gases having a temperature sufficiently higher than that required for calcination, to cause clinkering of the said material, and passing the waste products of heat from the said rotary structure into the first mentioned structure for the utilization thereof as a portion of the heat for calcination.

4. An apparatus for the described purpose, the same comprising a vertically disposed stationary calcining furnace, means therein for propelling pulverulent material to be treated therethrough, means for intermixing with the pulverulent material a fuel medium, means for introducing within the furnace a heat medium having a temperature sufficient to cause calcination of the material passing therethrough, and flowing counter-current to the stream of material passing through the said furnace for calcination, a rotary clinkering furnace associated with the calcining furnace, means for transferring the calcined material discharging from the calcining furnace directly into the rotary clinkering furnace, means for introducing into the clinkering furnace a heat medium of a temperature to cause clinkering of the calcined material as passed therethrough and counterwise to the flowing stream of the heat medium, means for conveying the products of combustion from the clinkering furnace into the calcining furnace, a cooler associated with the clinkering furnace and adapted to receive the clinkered material discharging therefrom, and means for delivering air passing through the cooler into the clinkering furnace for supporting combustion therein.

In testimony whereof I have signed my name to this specification.

ROBERT D. PIKE.